United States Patent
Kroener et al.

(10) Patent No.: US 9,128,758 B2
(45) Date of Patent: Sep. 8, 2015

(54) ENCODING DENSELY PACKED DECIMALS

(75) Inventors: Michael K. Kroener, Ehningen (DE); Christophe J. Layer, Boeblingen (DE); Petra Leber, Ehningen (DE); Silvia M. Mueller, Altdorf (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 967 days.

(21) Appl. No.: 13/296,273

(22) Filed: Nov. 15, 2011

(65) Prior Publication Data
US 2013/0124588 A1 May 16, 2013

(51) Int. Cl.
G06F 7/491 (2006.01)
G06F 7/499 (2006.01)

(52) U.S. Cl.
CPC ............. *G06F 7/491* (2013.01); *G06F 7/49915* (2013.01); *G06F 2207/4911* (2013.01); *G06F 2207/4912* (2013.01)

(58) Field of Classification Search
CPC .............................. G06F 7/493; G06F 7/49915
USPC .......................................... 708/496, 497, 498
See application file for complete search history.

(56) References Cited

U.S. PATENT DOCUMENTS

| 7,640,286 | B2 | 12/2009 | Lutz et al. | |
|---|---|---|---|---|
| 2008/0215659 | A1 | 9/2008 | Cowlishaw et al. | |
| 2008/0270506 | A1* | 10/2008 | Lundvall et al. | 708/495 |
| 2008/0270509 | A1* | 10/2008 | Lundvall et al. | 708/510 |
| 2010/0312812 | A1* | 12/2010 | Wang | 708/505 |
| 2012/0011185 | A1* | 1/2012 | Mohamed et al. | 708/497 |

OTHER PUBLICATIONS

Cowlishaw; Densely Packed Decimal Encoding; IEE Proc.—Comput. Digit. Tech.; May 2002; pp. 102-104; vol. 149; No. 3.
IEEE; IEEE Standard for Floating-Point Arithmetic; Aug. 29, 2008; pp. 1-58; IEEE Std 754-2008 (Revision of IEEE Std 754-1985).

* cited by examiner

*Primary Examiner* — Chuong D Ngo
(74) *Attorney, Agent, or Firm* — James L. Baudino

(57) ABSTRACT

According to one aspect of the present disclosure, a method and technique for encoding densely packed decimals is disclosed. The method includes: executing a floating point instruction configured to perform a floating point operation on decimal data in a binary coded decimal (BCD) format; determining whether a result of the operation includes a rounded mantissa overflow; and responsive to determining that the result of the operation includes a rounded mantissa overflow, compressing a result of the operation from the BCD-formatted decimal data to decimal data in a densely packed decimal (DPD) format by shifting select bit values of the BCD formatted decimal data by one digit to select bit positions in the DPD format.

14 Claims, 5 Drawing Sheets

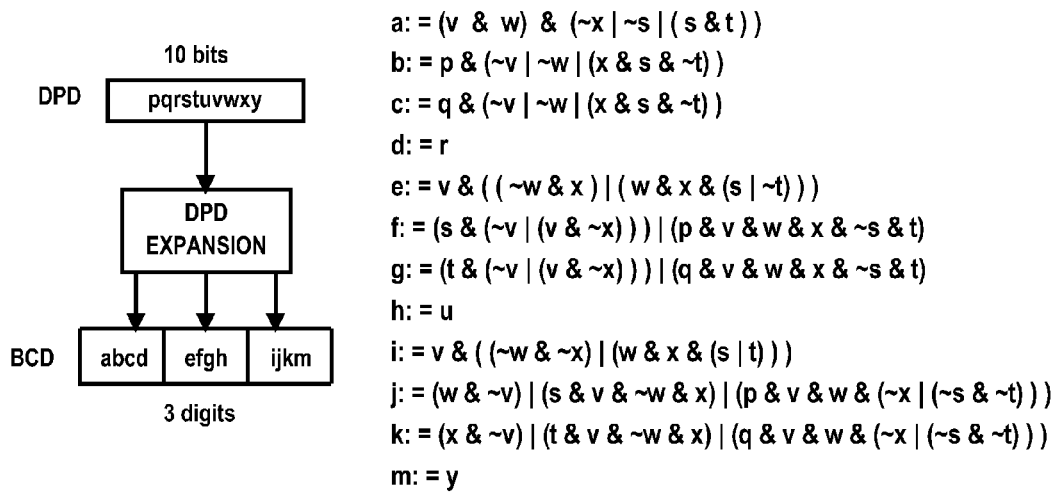

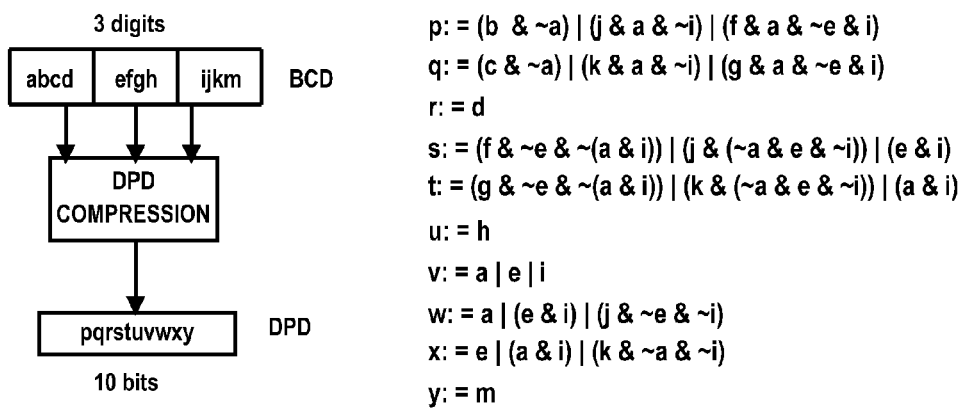

ENCODING DENSELY PACKED DECIMALS

BACKGROUND

In computer or data processing systems, decimal operations are usually executed in a densely packed decimal (DPD) format as defined in the IEEE 754-2008 standard. Another commonly used base ten numeric representation is a packed decimal format referred to as binary coded decimal (BCD). In BCD format, a number is represented such that four bits of every byte are allocated to a single decimal digit. In DPD format, three decimal digits that normally take up twelve bits in a BCD encoding format are compacted into ten bits. To execute instructions/operations in a decimal floating-point-unit of a data processing system, data that is stored in DPD format is converted from DPD to BCD (sometimes referred to as DPD to BCD expansion). After the operation is executed on the BCD-formatted data, if desired, the data result may be converted from BCD to DPD (sometimes referred to as BCD to DPD compression).

During execution of a decimal floating point operation, an intermediate result of an operation may require rounding to maintain a target numerical precision. Depending on the rounding condition, rounding may either truncate a mantissa at a certain width or truncate the mantissa and increment the mantissa. If the mantissa is incremented, the rounded mantissa may gain an extra digit in width, which can cause the mantissa to exceed its maximal precision width. In such a case, a post-rounding correction process is performed on the mantissa overflow of the expected mantissa length (i.e., a carry-out to the next digit, which may be referred to as "overflow") by, for example, dividing the mantissa by ten and incrementing an exponent value by one.

BRIEF SUMMARY

According to one aspect of the present disclosure a method and technique for encoding densely packed decimals is disclosed. The method includes: executing a floating point instruction configured to perform a floating point operation on decimal data in a binary coded decimal (BCD) format; determining whether a result of the operation includes a rounded mantissa overflow; and responsive to determining that the result of the operation includes a rounded mantissa overflow, compressing a result of the operation from the BCD-formatted decimal data to decimal data in a densely packed decimal (DPD) format by shifting select bit values of the BCD formatted decimal data by one digit to select bit positions in the DPD format.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which:

FIG. 4 is a diagram illustrating a DPD to BCD expansion process for digital data conversion;

FIG. 5 is a diagram illustrating a BCD to DPD compression process for digital data conversion;

DETAILED DESCRIPTION

Figure 1:
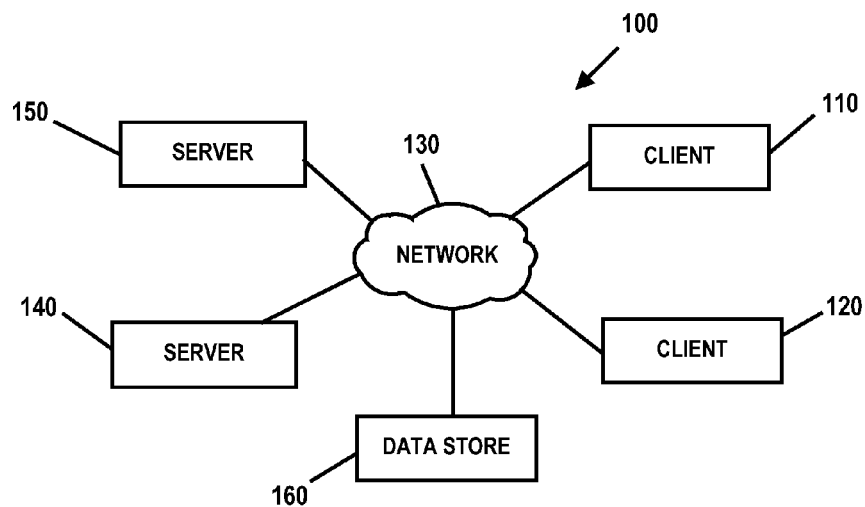
FIG. 1 is an embodiment of a network of data processing systems in which the illustrative embodiments of the present disclosure may be implemented.

Embodiments of the present disclosure provide a method, system and computer program product for encoding densely packed decimals. For example, in some embodiments, the method and technique includes: executing a floating point instruction configured to perform a floating point operation on decimal data in a binary coded decimal (BCD) format; determining whether a result of the operation includes a rounded mantissa overflow; and responsive to determining that the result of the operation includes a rounded mantissa overflow, compressing a result of the operation from the BCD-formatted decimal data to decimal data in a densely packed decimal (DPD) format by shifting select bit values of the BCD formatted decimal data by one digit to select bit positions in the DPD format. Thus, in some embodiments of the present disclosure, BCD-formatted data having a mantissa overflow resulting from a rounding operation is quickly encoded to a DPD format by shifting and re-aligning select bit values of the BCD-formatted data by one digit to certain bit positions in the DPD-formatted data and setting remaining bit values for the DPD-formatted data to zero. Thus, embodiments of the present disclosure enable a more efficient BCD-to-DPD compression without the need for additional pipeline processing.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
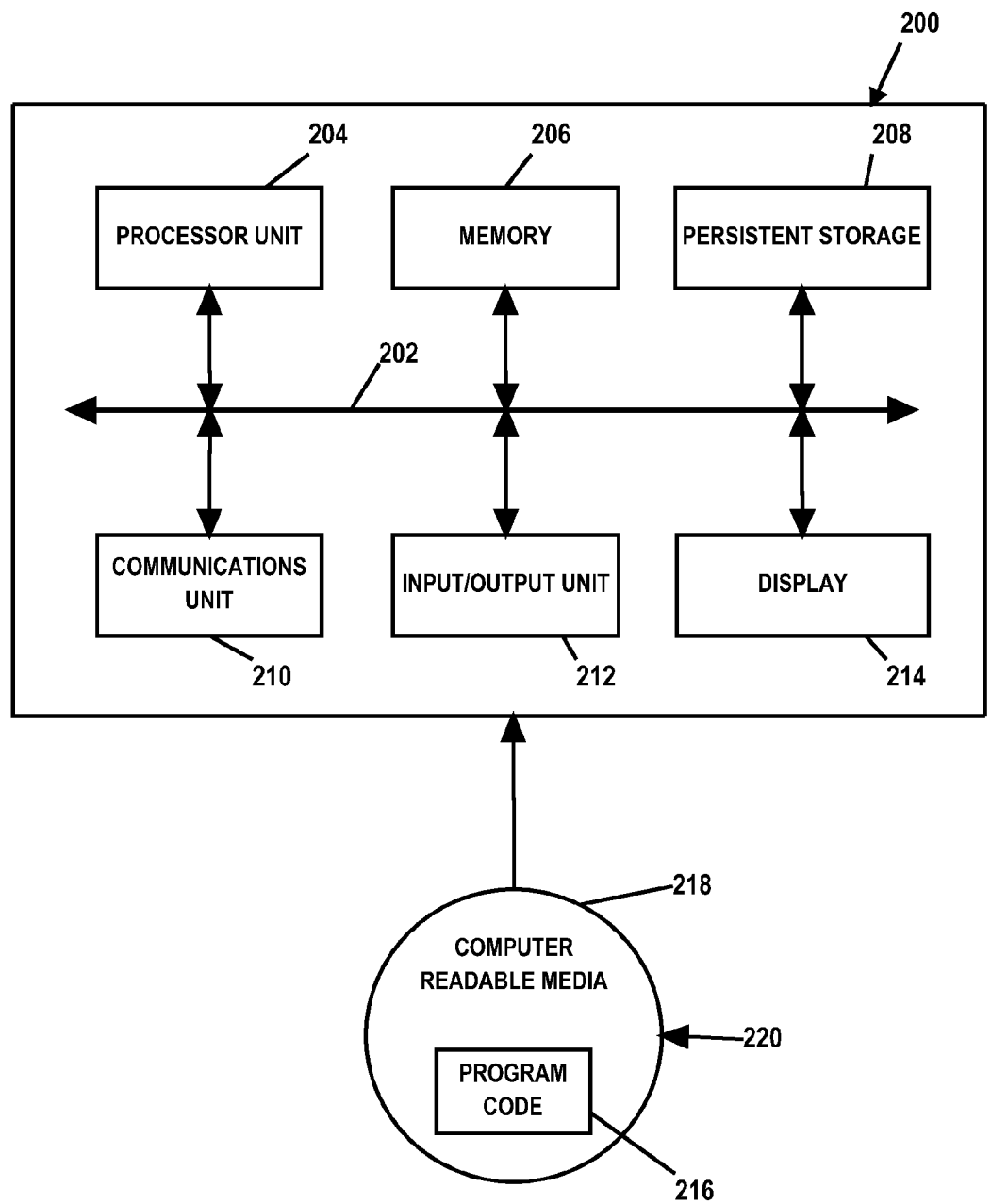
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM System P® servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for encoding densely packed decimals according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
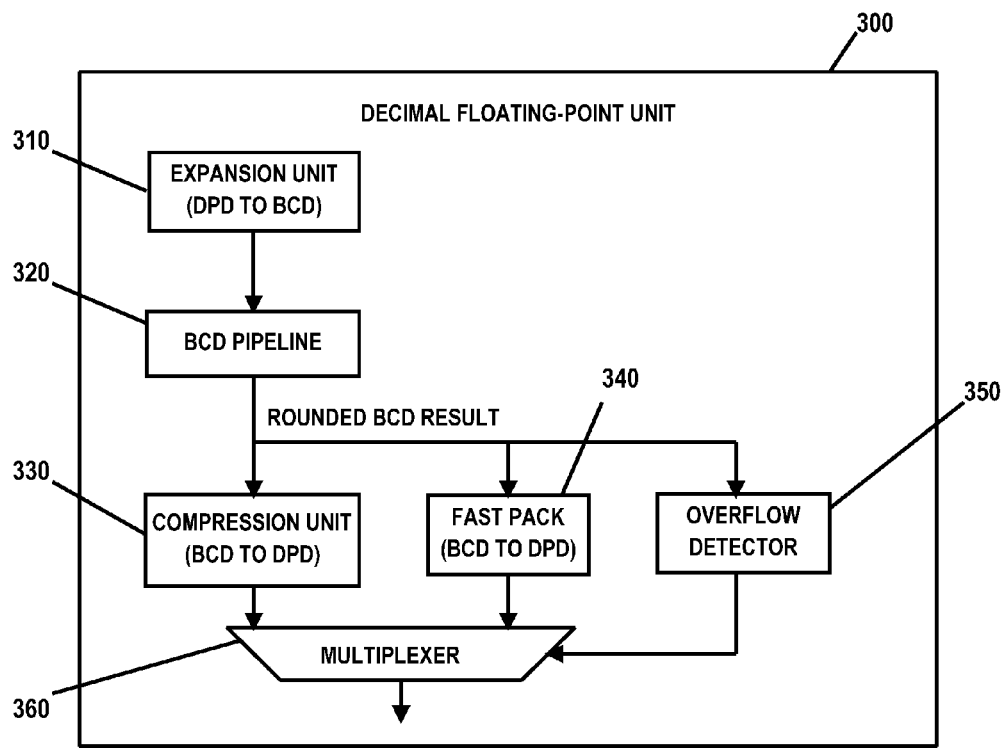
FIG. 3 is a diagram illustrating an embodiment of a decimal floating-point unit of the data processing system of FIG. 2 in which illustrative embodiments of the present disclosure may be implemented.

FIG. 3 is an illustrative embodiment of a decimal floating-point unit (DFU) 300 for encoding densely packed decimals. DFU 300 may be implemented on data processing systems or platforms such as, but not limited to, servers 140 and/or 150, clients 110 and/or 120, or at other data processing system locations. In the embodiment illustrated in FIG. 3, DFU 300 comprises an expansion unit 310 for conversion or expansion of decimal data in DPD format to decimal data in BCD format, a BCD pipeline for executing one or more instructions configured to perform a floating point operation on decimal data in a BCD format, and a compression unit 330 for conversion or compression of the decimal data in BCD format to decimal data in DPD format. In the embodiment illustrated in FIG. 3, DFU 300 also includes a fast pack unit 340, an overflow detector 350, and a multiplexer 360. Overflow detector 350 is configured to detect a mantissa overflow of a rounded mantissa of an intermediate result of a floating point operation on BCD-formatted data processed in the BCD pipeline 320. For example, in a decimal floating-point unit, the mantissa of the intermediate result is in BCD format; however, for the final result, the mantissa needs to be compressed from BCD into DPD format. Floating-point arithmetic implements rounding to reduce the wide intermediate result back into target precision. Depending on the rounding condition, rounding either truncates the mantissa at a certain width or truncates and increments the mantissa. In case of an increment, the rounded mantissa can gain an extra digit in width (e.g., 999.9 is rounded up to 1000), which can cause the mantissa to exceed its maximal width or significant digit precision. In case of such a mantissa overflow, a post-rounding correction is performed (e.g., dividing the mantissa by ten and incrementing the exponent by one). This correction takes place prior to compressing the mantissa into DPD format. Thus, overflow detector 350 is configured to detect a mantissa overflow of a rounded mantissa of an intermediate result of a floating point operation on BCD-formatted data.

In FIG. 3, multiplexer 360 is used to select between a standard BCD-to-DPD compression of the data result from BCD pipeline 320 or a fast pack encoding of data from BCD to DPD format according to the present disclosure based on whether a mantissa overflow is detected (e.g., by overflow detector 350). As will be described in further detail below, fast pack unit 340 encodes the digital data into DPD format by mapping select bit values of the BCD-formatted data to select bit positions in the DPD format representation. The fast pack unit 340 may be implemented in any suitable manner using known techniques that may be hardware-based, software-based, or some combination of both. For example, fast pack unit 340 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

FIG. 4 is a diagram illustrating a DPD format to BCD format expansion process for digital data conversion (e.g., performed on data before being processed by BCD pipeline 320), and FIG. 5 is a diagram illustrating a BCD format to DPD format compression process for digital data conversion (e.g., performed on result data processed by BCD pipeline 320). For example, DPD is a lossless code which packs three decimal digits (3^4 bits) into ten bits. As described above, within the execution BCD pipeline 320 of DFU 300, data is processed in BCD format. For expansion, the ten bits (represented as "pqrstuvwxy") are decoded to form three BCD digits (represented as "abcd," "efgh" and "ijkm"), using the mappings and Boolean operations illustrated in FIG. 4 ("&"—AND; "|"—OR; and "~"—NOT). During compression, three BCD digits (comprising the bits abcd, efgh, and ijkm, respectively) are encoded into ten bits (pqrstuvwxy) using the mappings and Boolean operations illustrated in FIG. 5.

As described above, due to rounding, the intermediate result of a decimal floating-point operation might need to be incremented. The increment can cause the mantissa of the result to be one significant digit wider. Due to limited result width, this can cause the mantissa of the rounded result to be one digit too wide; the rounded result needs to be corrected (post-rounding correction) before its mantissa can be compressed into the DPD format. As an example, consider the following re-rounding illustration. In this example, the re-round instruction is to maintain two significant digits (N=2):

Input=9999*10^6
Re-round to N=2 digits
Result before rounding=99.99*10^8
Result after rounding=100*10^8
Output=10*10^9 (post-rounding correction shift)

In present systems, for some instructions, this mantissa overflow condition is detected very late and either requires an extra pipeline stage, which adds to the delay of all instructions, or it requires that instructions with such late overflow detection have a second pass through the execution unit to perform the correction. In the latter case, those special instructions block the pipeline for two cycles and require more complicated state machines and interfaces to the processor.

Thus, for example, if a pipeline result before rounding is 9 ... 9, the result after the rounding increment is 10 ... 0 (one more digit). The compression process from BCD to DPD for example values of 100, 10 and 1 would be:

BCD=(0001)(0000)(0000)→DPD=(001 000 0 000)
BCD=(0000)(0001)(0000)→DPD=(000 001 0 000)
BCD=(0000)(0000)(0001)→DPD=(000 000 0 001)

Figure 6:
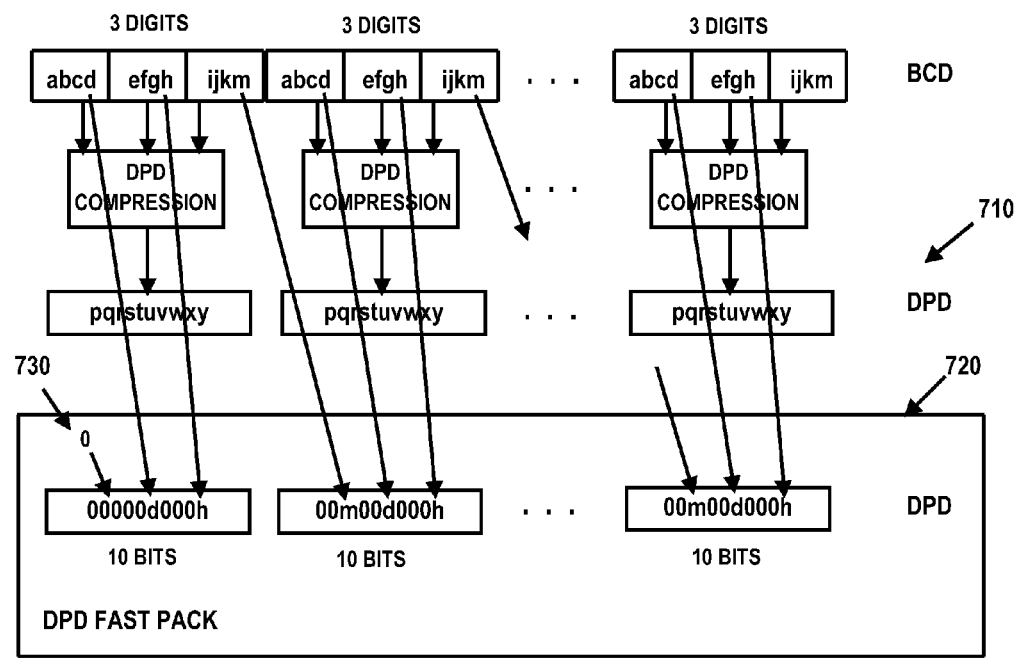
FIG. 6 is a diagram illustrating a method for encoding densely packed decimal data from BCD format to DPD format according to an embodiment of the present disclosure.

Embodiments of the present disclosure provide an efficient way to encode the rounded mantissa in the case of a mantissa overflow. In such a case, the rounded mantissa prior to the correction is a string of all zeros with a single digit of "1" inserted somewhere in the string. Note that in the fast pack method of the present disclosure, only one single digit is "0001" and all the others are zero. Thus, according to the present disclosure, certain bit values of the BCD-formatted data are re-aligned to certain bit positions in the DPD format (shifted by one digit) while the Boolean operations normally associated with a BCD-DPD compression are omitted. Thus, according to embodiments of the present fast pack encoding method of this disclosure, the bit position re-alignment (with one digit shift) for BCD-to-DPD compression corresponds to the following:

BCD=(abcd)(efgh)(ijkm) DPD=(pqr stu v wxy)
p=0
q=0
r=m (of the digit with next higher significance)
s=0
t=0
u=d
v=0
x=0
y=h FIG. 6 is a diagram illustrating a method for encoding densely packed decimal data from BCD format to DPD format according to an embodiment of the present disclosure. In the embodiment illustrated in FIG. 6, encoding or compressing BCD-formatted decimal data to DPD format may be performed either by the method described and illustrated in FIG. 5 (no mantissa overflow) or by the DPD fast pack method as described above in response to detecting a mantissa overflow (bit position re-alignment with one digit shift). In FIG. 6, if no mantissa overflow is detected by overflow detector 350 (FIG. 3), compression of the BCD data result from pipeline 320 is performed normally (as described in connection with FIG. 5) as indicated by reference number 710. If overflow detector 350 detects a mantissa overflow resulting from a rounding operation, the BCD-formatted decimal data is encoded or compressed to the DPD format, indicated in FIG. 6 by reference number 720, by shifting and re-aligning select bit values of the BCD-formatted data to select bit positions in the DPD format. As described above, the shift and re-alignment fast pack method of the present disclosure shifts and maps/re-aligns select bit values of the BCD-formatted data result (bit values corresponding to positions "m," "d" and "h" in the BCD format) to select bit positions in the DPD format (respective bit positions "r," u" and "y" in the DPD format) while the remaining bit positions in the DPD format ("p," "q," "s," "t," "v," "w" and "x") are zero, thereby omitting the Boolean operations normally associated with a standard BCD-to-DPD compression. In the example of FIG. 6, the digit with next higher significance is assumed to be zero (indicated by reference number 730); however, it should be understood that this value will depend on the rounded result of the mantissa.

Thus, in some embodiments of the present disclosure, the fast pack DPD compression method comprises collecting the appropriate bits of the BCD-formatted data and mapping the collected bits to the shifted bit positions of the DPD format without the need for any logic. In operation, the overflow signal from detector 350 (FIG. 3) is used to select between the two possible encoding/compression options—standard BCD-to-DPD compression if no mantissa overflow, or the fast pack encoding if a mantissa overflow is detected.

Figure 7:
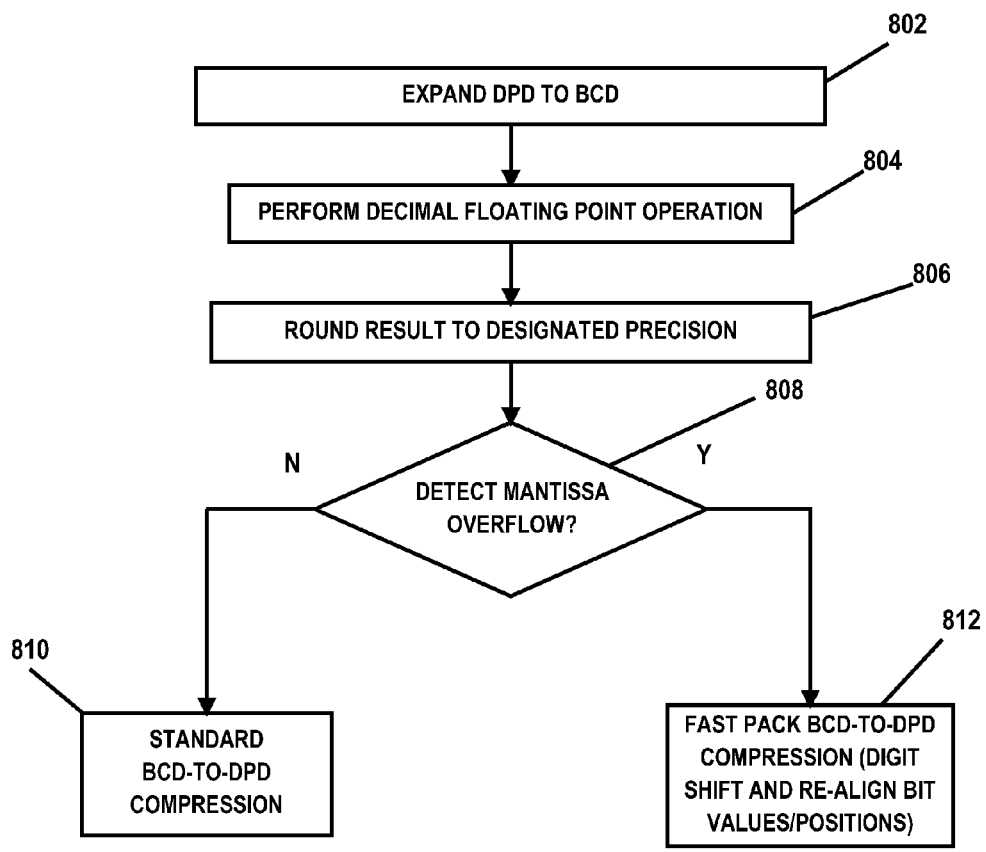
FIG. 7 is a flow diagram illustrating an embodiment of a method for encoding densely packed decimal data from BCD format to DPD.

FIG. 7 is a flow diagram illustrating an embodiment of a method for encoding densely packed decimals in accordance with the present disclosure. The method begins at block 802, where DPD-formatted decimal data is expanded to BCD-formatted decimal data by expansion unit 310. At block 804, a decimal floating point operation is performed on the data (e.g., in BCD pipeline 320). At block 806, the result of the floating point operation is rounded, if needed, to a designated precision. At decisional block 808, a determination is made whether the rounded result includes a mantissa overflow. If the rounded result does not include a mantissa overflow, the method proceeds to block 810, where the BCD-formatted result data is compressed to DPD format using the standard DPD compression operation (e.g., as set forth in FIG. 5). If the rounded result does include a mantissa overflow, the method proceeds to block 812, where the BCD-formatted result data is encoded or compressed to DPD format using a fast pack by shifting a digit of the result (in a lower significant digit direction) and re-aligning select bits of the BCD-formatted data with select bit locations according to the DPD format.

Thus, embodiments of the present disclosure enable a more efficient process of encoding or compressing BCD-formatted decimal data to a DPD format. For example, embodiments of the present disclosure enable BCD-formatted data having a mantissa overflow resulting from a rounding operation to be quickly encoded to a DPD format by shifting and re-aligning select bit values of the BCD-formatted data to certain bit positions for the DPD-formatted data and setting remaining bit values for the DPD-formatted data to zero. Thus, embodiments of the present disclosure enable a more efficient BCD-to-DPD compression without the need for additional pipeline processing. Accordingly, embodiments of the present disclosure enable post-rounding and DPD compression of the decimal data to take place in parallel.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for encoding densely packed decimals, comprising:
executing, by a decimal floating-point unit (DFPU), a floating point instruction configured to perform a floating point operation on decimal data in a binary coded decimal (BCD) format;
determining whether a result of the operation includes a rounded mantissa overflow;
responsive to determining that the result of the operation does not include a rounded mantissa overflow, applying Boolean operations to compress the result of the operation from the BCD-formatted decimal data to decimal data in a densely packed decimal (DPD) format; and
responsive to determining that the result of the operation includes a rounded mantissa overflow, compressing the result of the operation from the BCD-formatted decimal data to decimal data in the DPD format by mapping by the DFPU select bit values of the BCD formatted decimal data to select bit positions in the DPD format while omitting the Boolean operations.

2. The method of claim 1, wherein the mapping comprises shifting select bit values by one digit lower in significance.

3. The method of claim 1, wherein the mapping comprises re-aligning the select bit values to bit positions different than an alignment of a standard BCD-to-DPD compression process.

4. The method of claim 2, further comprising setting remaining bit positions of the DPD-formatted data to zero when omitting the Boolean operations.

5. A system for encoding densely packed decimals, comprising:
a decimal floating-point unit comprising:
an expansion unit operable to expand decimal data in a densely packed decimal (DPD) format to decimal data in a binary coded decimal (BCD) format;
a pipeline operable to execute a floating point instruction configured to perform a floating point operation on the BCD-formatted decimal data; and
a multiplexer configured to selectively output a decimal data result of the floating point operation in DPD format using one of a standard DPD compression process or a fast pack DPD compression process based on a detection of a rounded mantissa overflow.

6. The system of claim 5, further comprising an overflow detector operable to detect a rounded mantissa overflow in the decimal data result of the floating point operation.

7. The system of claim 5, further comprising a fast pack unit operable to perform the fast pack DPD compression process by accumulating and mapping select bit values of the BCD-formatted result decimal data to select bit positions in the DPD format.

8. The system of claim 7, wherein the select bit values are shifted one digit in lower significance.

9. The system of claim 7, where remaining bit values of the BCD-formatted result decimal data are set to zero in the DPD-formatted data output.

10. The system of claim 7, wherein the fast pack unit is operable to re-align the select bit values to bit positions different than an alignment using the standard DPD compression process.

11. A computer-implemented method for encoding densely packed decimals, comprising:
receiving, from a pipeline of a decimal floating-point unit, decimal data in a binary coded decimal (BCD) format, the BCD-formatted decimal data comprising a result of a floating point operation in the pipeline;
rounding the BCD-formatted decimal result data to a designated precision;
determining whether the rounded result data includes a mantissa overflow from the designated precision;
responsive to determining that the rounded result data does not include a mantissa overflow, applying by the decimal floating-point unit Boolean operations to the rounded result data to compress the rounded result data to decimal data in a densely packed decimal (DPD) format; and
responsive to determining that the rounded result includes a mantissa overflow, compressing the rounded result data from the BCD format to decimal data in the DPD format by mapping select bit values of the BCD formatted rounded result decimal data to select bit positions in the DPD format.

12. The method of claim 11, wherein the mapping comprises shifting select bit values by one digit lower in significance.

13. The method of claim 11, wherein the mapping comprises re-aligning the select bit values to bit positions different than an alignment of a standard BCD-to-DPD compression process.

14. The method of claim 12, further comprising setting remaining bit positions of the DPD-formatted data to zero when omitting the Boolean operations.

* * * * *